US012679773B2

(12) United States Patent
Corral

(10) Patent No.: US 12,679,773 B2
(45) Date of Patent: Jul. 14, 2026

(54) HIGH TEMPERATURE CERAMIC POWDER SYSTEMS

(71) Applicant: Arizona Board of Regents on Behalf of the University of Arizona, Tucson, AZ (US)

(72) Inventor: Erica Corral, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 471 days.

(21) Appl. No.: 18/258,449

(22) PCT Filed: Dec. 20, 2021

(86) PCT No.: PCT/US2021/064281
§ 371 (c)(1),
(2) Date: Jun. 20, 2023

(87) PCT Pub. No.: WO2022/164542
PCT Pub. Date: Aug. 4, 2022

(65) Prior Publication Data
US 2024/0018055 A1 Jan. 18, 2024

Related U.S. Application Data

(60) Provisional application No. 63/128,424, filed on Dec. 21, 2020.

(51) Int. Cl.
*C04B 35/593* (2006.01)
(52) U.S. Cl.
CPC .... *C04B 35/593* (2013.01); *C04B 2235/3882* (2013.01); *C04B 2235/5454* (2013.01);
(Continued)

(58) Field of Classification Search
CPC .......... C04B 35/593; C04B 2235/5454; C04B 2235/767
See application file for complete search history.

(56) References Cited

U.S. PATENT DOCUMENTS 3,839,540 A 10/1974 Arrol
4,487,840 A 12/1984 Raj et al.
(Continued)

FOREIGN PATENT DOCUMENTS

CN 107188598 A 9/2017
CN 110342916 A 10/2019
CN 109696583 B 7/2021

OTHER PUBLICATIONS

Xu, Xin, et al. "New strategies for preparing nanosized silicon nitride ceramics." Journal of the American Ceramic Society 88.4 (2005): 934-937. (Year: 2005).*
(Continued)

*Primary Examiner* — Cameron K Miller
(74) *Attorney, Agent, or Firm* — Perkins Coie

(57) ABSTRACT

Disclosed are ceramic powder compositions that include Si, N, O, C, Mg, and/or Mn in tailored combinations of different crystalline phases for producing high temperature resistant and high strength ceramic products. In some aspects, a ceramic powder for producing high temperature-resistant and/or high mechanical strength materials comprises a silicon nitride ($Si_3N_4$) powder, comprising $Si_3N_4$ particles having a size within a range of 30 nm to 700 nm, wherein the $Si_3N_4$ powder include alpha and beta phase silicon nitride in an amount up to about 1-100% vol; and an impurity constituent intermixed with the $Si_3N_4$ powder within the ceramic powder, the impurity constituent comprising at least one of silicon (Si), nitrogen (N), oxygen (O), carbon (C), magnesium (Mg), or manganese (Mn), wherein the impurity
(Continued)

100

O
101

⊚
102 constituent constitutes less than about 0.1% wt to 15% wt of the ceramic powder.

4 Claims, 3 Drawing Sheets

(52) U.S. Cl.
CPC .. *C04B 2235/6567* (2013.01); *C04B 2235/77* (2013.01); *C04B 2235/785* (2013.01); *C04B 2235/87* (2013.01); *C04B 2235/9607* (2013.01)

(56) References Cited

U.S. PATENT DOCUMENTS

| | | | |
|---|---|---|---|
| 4,590,053 A * | 5/1986 | Hashimoto | ......... C01B 21/0685 |
| | | | 423/406 |
| 4,708,943 A | 11/1987 | Hsieh et al. | |
| 6,187,706 B1 | 2/2001 | Okabe et al. | |
| 6,297,184 B1 | 10/2001 | Fukudome et al. | |
| 6,579,819 B2 | 6/2003 | Hirosaki et al. | |
| 8,962,504 B2 | 2/2015 | Corral et al. | |
| 9,296,190 B1 | 3/2016 | Corral et al. | |
| 2007/0228317 A1 | 10/2007 | Barrera et al. | |
| 2014/0378294 A1 * | 12/2014 | Corral | ..................... C04B 35/78 |
| | | | 501/99 |

OTHER PUBLICATIONS https://www.acsmaterial.com/graphene-nanoplatelets-2-10nm. html#:~:text=Graphene%20Nanoplatelets%20(2%2D10nm), GNNP0031%2D1Kg Accessed Jan. 29, 2026 (Year: 2026).*

Feilden, Ezra, et al., "High temperature strength of an ultra high temperature ceramic produced by additive manufacturing," Ceramics International 45 (2019) 18210-18214.

Gild, Joshua, et al., "Reactive flash spark plasma sintering of high-entropy ultrahigh temperature ceramics," Scripta Materialia 170 (2019) 106-110.

International Search Report and Written Opinion mailed Aug. 17, 2022 for International Patent Application No. PCT/US2021/064281 (15 pages).

Simonenko, E. P. et al., "Production of HfB2—SiC (10-65 vol. % SiC) Ultra-High-Temperature Ceramics by Hot Pressing of HfB2-(SiO2—C) Composite Powder Synthesized by the Sol-Gel Method," Russ. J. of Inorganic Chem., 2018, vol. 63, No. 1, pp. 1-15.

The American Ceramic Society, Conference program for 38th International Conference and Exposition on Advanced Ceramics and Composites, Jan. 26-31, 2014, 72 pages.

Ellis et al. "Microstructural control of spark plasma sintered silicon nitride powder blends with low concentration magnesium nitride sintering additives," 38th International Conference and Exposition on Advanced Ceramics and Composites, Jan. 26, 2014, 15 pages.

Pinc et al. "Development of an Oxide Additive Free, Spark Plasma Sintered, High Strength Silicon Nitride System," National Space and Missile Materials Symposium, Jun. 27, 2013, 18 pages.

Pinc et al. "Development of an Oxide Additive Free, Spark Plasma Sintered, High Strength Silicon Nitride System," Pacific Rim Conference on Ceramic and Glass Technology, Jun. 7, 2013, 18 pages.

Pinc et al. "Direct Current Sintering (DCS) for rapid, large scale densification of silicon nitride ceramics," 38th International Conference and Exposition on Advanced Ceramics and Composites, Jan. 26, 2014, 16 pages.

Walker et al. "Powder Processing Effects on the Rapid Low-Temperature Densification of ZrB2—SiC Ultra-High Temperature Ceramic Composites Using Spark Plasma Sintering," Journal of American Ceramic Society, 2012, 95 (1):194-203.

* cited by examiner

100

101                    102

200

98α–2β HSA

1800°C–10min–10MPa

100% β-Si$_3$N$_4$,624 nm Grains 1.75 Aspect Ratio, 1022 MPa, 99.3%TD

Fracture Toughness 8.1 ±1.2 MPa·m$^{1/2}$

60α–40β Seeded

1700°C–0min–10MPa

100% β-Si$_3$N$_4$, 401 nm Grains, 1.32 Aspect Ratio, 286 MPa, 80.8%TD

Fracture Toughness 4.7 ±0.6 MPa·m$^{1/2}$

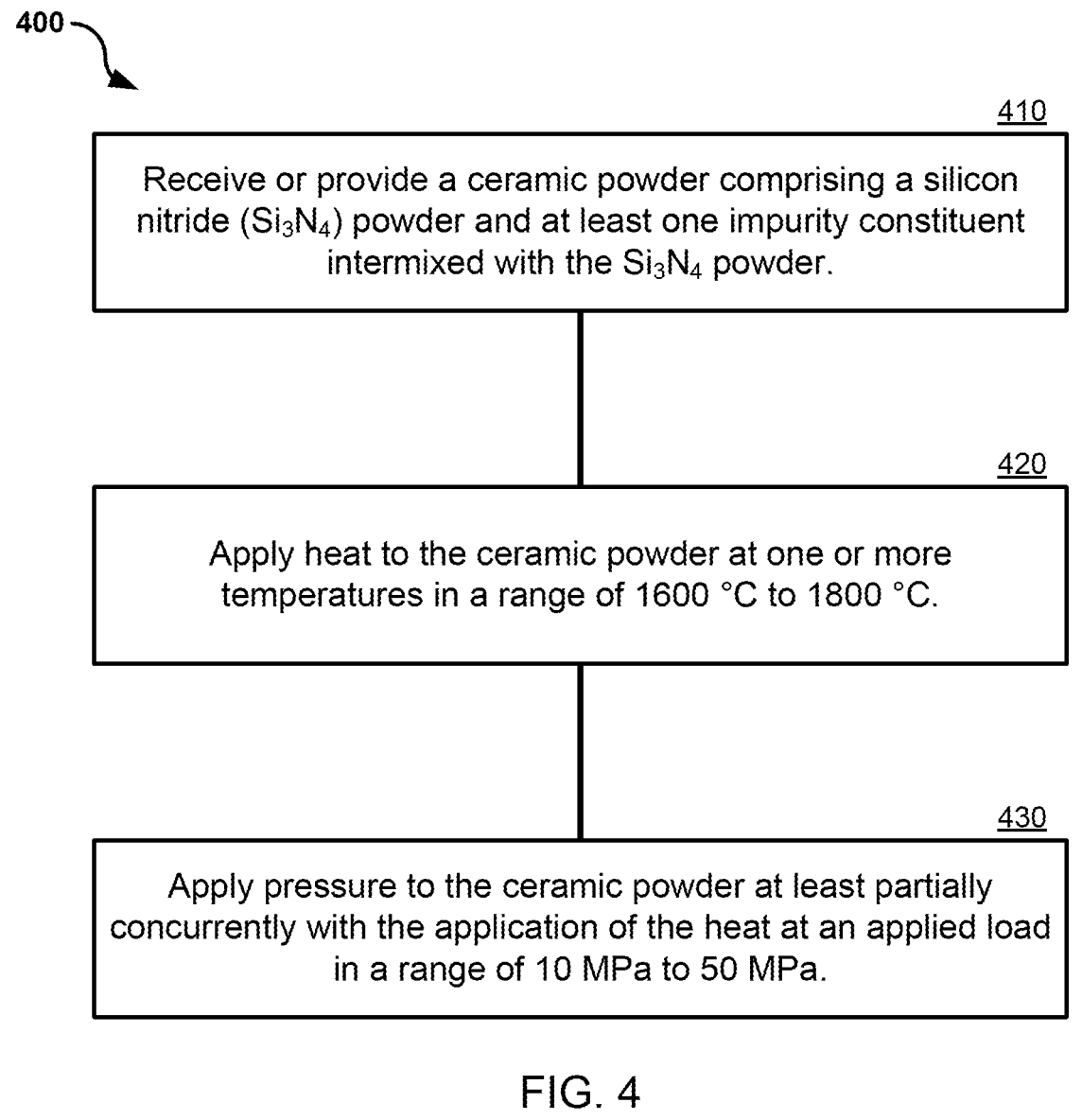

400

410

Receive or provide a ceramic powder comprising a silicon nitride ($Si_3N_4$) powder and at least one impurity constituent intermixed with the $Si_3N_4$ powder.

420

Apply heat to the ceramic powder at one or more temperatures in a range of 1600 °C to 1800 °C.

430

Apply pressure to the ceramic powder at least partially concurrently with the application of the heat at an applied load in a range of 10 MPa to 50 MPa.

FIG. 4

HIGH TEMPERATURE CERAMIC POWDER SYSTEMS

CROSS-REFERENCE TO RELATED APPLICATIONS

This patent document is a 371 National Stage Application of International Patent Application No. PCT/US2021/064281, filed Dec. 20, 2021, which claims priorities to and benefits of U.S. Provisional Patent Application No. 63/128,424, titled "HIGH TEMPERATURE CERAMIC POWDER SYSTEMS" and filed on Dec. 21, 2020. The entire contents of the aforementioned patent applications are incorporated by reference as part of the disclosure of this patent document.

STATEMENT REGARDING FEDERALLY SPONSORED RESEARCH

This invention was made with government support under Grant Nos. 0954110 awarded by National Science Foundation. The government has certain rights in the invention.

TECHNICAL FIELD

This patent document relates to ceramic powders.

BACKGROUND

Ceramic coatings provide a thermal barrier and a layer of protection from corrosion on high heat. Such coatings have been used in various industries for fabricating high temperature-resistant components for spacecraft, electronics, and automotive applications, among others. Yet, the ability to control the mechanical, thermal, and electrical properties in a ceramic powder that is used for creating ceramic parts exhibiting high temperature resistance and high strength at high temperatures has posed significant challenges in materials processing.

SUMMARY

Disclosed are ceramic powder compositions that include Si, N, O, C, Mg, and/or Mn in tailored combinations of different crystalline phases for producing high temperature-resistant and high strength ceramic products.

In some embodiments, a ceramic powder for producing high temperature-resistant and/or high mechanical strength materials includes a silicon nitride ($Si_3N_4$) powder, comprising $Si_3N_4$ particles, wherein the $Si_3N_4$ powder includes beta phase silicon nitride ($\beta$-$Si_3N_4$) in an amount up to about 1% vol; and an impurity constituent intermixed with the $Si_3N_4$ powder within the ceramic powder, the impurity constituent comprising at least one of silicon (Si), nitrogen (N), oxygen (O), carbon (C), magnesium (Mg), or manganese (Mn), wherein the impurity constituent constitutes less than about 0.1% wt to 5% wt of the ceramic powder.

In some embodiments, a material having high temperature resistance and/or high mechanical strength includes a densified silicon nitride ($Si_3N_4$) material, the densified $Si_3N_4$ material having grain sizes of 240 nm or less, wherein the densified $Si_3N_4$ material is produced by a sintering process comprising: providing a ceramic powder comprising a silicon nitride ($Si_3N_4$) powder and at least one impurity constituent intermixed with the $Si_3N_4$ powder, wherein the $Si_3N_4$ powder includes $Si_3N_4$ particles having a size within a range of 30 nm to 70 nm and includes beta phase silicon nitride ($\beta$-$Si_3N_4$) in an amount up to about 1% vol, and wherein the at least one impurity constituent includes at least one of silicon (Si), nitrogen (N), oxygen (O), carbon (C), magnesium (Mg), or manganese (Mn) and constitutes less than about 0.1% wt to 5% wt of the ceramic powder; applying heat to the ceramic powder at one or more temperatures in a range of 1600° C. to 1800° C.; and applying pressure to the ceramic powder at least partially concurrently with applying the heat at an applied load in a range of 10 MPa to 50 MPa.

In some embodiments, a ceramic powder for producing high temperature-resistant and/or high mechanical strength materials, consisting essentially of a silicon nitride ($Si_3N_4$) powder, comprising $Si_3N_4$ particles having a size within a range of 30 nm to 70 nm, wherein the $Si_3N_4$ powder includes beta phase silicon nitride ($\beta$-$Si_3N_4$) in an amount up to about 1% vol; and one or more impurity constituents intermixed with the $Si_3N_4$ powder within the ceramic powder, the one or more impurity constituents selected from silicon (Si), nitrogen (N), oxygen (O), carbon (C), magnesium (Mg), or manganese (Mn), wherein the one or more impurity constituents constitutes less than about 0.1% wt to 5% wt of the ceramic powder.

BRIEF DESCRIPTION OF THE DRAWINGS

FIG. 4 shows a diagram illustrating an example method for producing a material having high temperature resistance and/or high mechanical strength in accordance with the present technology.

DETAILED DESCRIPTION

Figure 1:
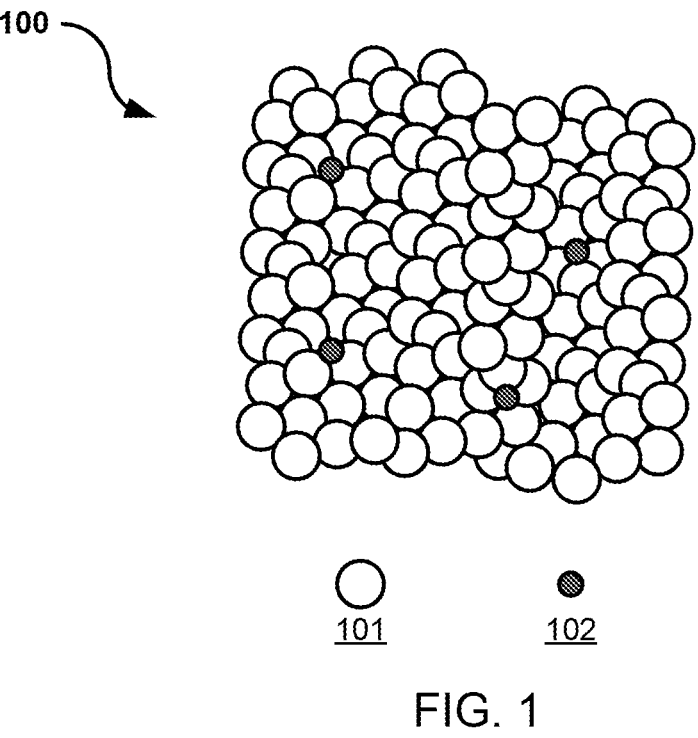
FIG. 1 shows a diagram illustrating a ceramic powder in accordance with some embodiments of the present technology.

With the increase usage of ceramic powder in various industry applications, there is a need to develop ceramic powder systems that can have higher strength at higher temperatures. This will increase the reusability and durability of material by providing higher performance.

Sintered silicon nitride materials have been known to provide these desired properties for ceramic coatings, such as high temperature resistive strength and toughness. However, the sintering process for silicon nitride materials has undergone much experimentation and evolutions to arrive at the present standard practices of using additives to provide stability.

Presently, high temperature-resistant and high strength ceramic materials that contain silicon nitride are manufactured using at high temperature sintering processes, which without additive compounds, such as aluminum oxide ($Al_2O_3$), yttrium oxide ($Y_2O_3$), cerium oxide ($CeO_2$), or magnesium oxide (MgO), that are introduced during (e.g., at the beginning of) the sintering process, typically result in abnormal grain growth. As a result, much work has been carried out in determining (i) what additives achieve suitable outcomes of the final sintered silicon nitride material and (ii) under what optimal conditions should these additives be introduced. Although additives have brought stability to controlling grain growth, the additives have put limitations on the final silicon nitride material properties, including grain size, grain interphase boundaries, and other micro-structure properties.

Disclosed are ceramic powder systems that include silicon (Si), nitrogen (N), oxygen (O), carbon (C), magnesium (Mg), and/or manganese (Mn) tailored certain combinations of different compositions and crystalline phases for producing high temperature-resistant and high strength ceramic products.

In some aspects in accordance with embodiments of the present technology, a ceramic powder composition comprising silicon nitride includes a combination of different crystalline phases and intentional impurities for forming ceramic coatings or materials with controlled mechanical, thermal and electrical properties based on solid solution (e.g., powder) processing of the various crystalline forms of the disclosed ceramic powder system. For example, Si—N based materials have high strength at room temperature greater than 1000 MPa. The high temperature ceramic powder systems allow for the potential creation of high temperature ceramic parts that are high temperature resistant and high strength at temperature.

The resulting microstructure of a processed ceramic material will contain grains without a secondary phase of oxides or glasses because the impurities in the disclosed ceramic powder blend are reacted at high temperature during sintering. The role of the impurities is to assist in sintering and densification without creating a secondary phase in the microstructure at the grain boundaries that limits high temperature performance.

The disclosed ceramic powder systems include a silicon nitride ($Si_3N_4$) powder blend that is configured for materials processing, e.g., sintering, to produce high temperature-resistant and/or high-strength materials that can be tailored to meet specific material design criteria for high temperature (and room temperature) applications. Such specialized material applications producible from the disclosed ceramic powder systems can include, for example, ceramic coatings suitable for exhaust system components, high temperature electronic components, spacecraft components, and hypersonic aeronautic components. In some examples, the disclosed ceramic powder can be used for manufacturing high-strength and high-temperature ceramic parts for a turbine engine operating at low and/or high temperature, radio frequency antenna operating at room, low and/or high temperature, and high temperature wear materials for drilling.

Example Embodiments

In some embodiments, for example, a ceramic powder for producing high temperature-resistant and/or high mechanical strength materials includes a $Si_3N_4$ powder, which comprises $Si_3N_4$ particles having a size within a range of 30 nm to 700 nm, and which the $Si_3N_4$ powder includes alpha phase and beta phase silicon nitride in an amount of about 1% vol to 100% vol. In some embodiments, for example, the $Si_3N_4$ powder comprises $Si_3N_4$ particles having a size within a range of 30 nm to 70 nm, in which the $Si_3N_4$ powder includes beta phase silicon nitride ($\beta$-$Si_3N_4$) in an amount up to about 1% vol. The ceramic powder includes an impurity constituent intermixed with the $Si_3N_4$ powder within the ceramic powder, where the impurity constituent includes at least one of Si, N, O, C, Mg, and/or Mn, where the impurity constituent constitutes less than about 0.1% wt to 15% wt of the ceramic powder. In some embodiments, for example, the ceramic powder includes the intermixed impurity constituent(s) (e.g., Si, N, O, C, Mg, and/or Mn), where the impurity constituent(s) are less than about 0.1% wt to 5% wt of the ceramic powder.

Further embodiments and implementations of the example ceramic powder can include one or more of the following features. For example, the impurity constituent includes elemental Si, C, Mg or Mn. Also, for example, the impurity constituent of the ceramic powder can include a compound selected from $SiO_2$, SiC, MgO, or MnO. Also, for example, the $Si_3N_4$ powder can include or may consist essentially of alpha phase silicon nitride ($\alpha$-$Si_3N_4$) in an amount up to about 99.99% vol and beta phase silicon nitride ($\beta$-$Si_3N_4$) in an amount up to about 1% vol.

FIG. 1 shows a diagram illustrating an example ceramic powder in accordance with some embodiments of the present technology. As illustrated in the example, the ceramic powder 100 includes $Si_3N_4$ particles 101, e.g., having at least one size dimension of 30 nm to 70 nm. The example $Si_3N_4$ particles 101 may have various morphologies and degrees of crystallinity. In some examples, the $Si_3N_4$ particles 101 are of heterogenous phase, where within the particles, an $\alpha$-$Si_3N_4$ phase and $\beta$-$Si_3N_4$ phase are present. It is understood that the diagram of FIG. 1 is for illustrative purposes only, and is not necessarily representative of embodiments of the ceramic powder in terms of size, shape or distribution of particles, concentration ratios, or other materials properties.

In some embodiments, for example, a material having high temperature resistance and/or high mechanical strength includes a densified $Si_3N_4$ material, the densified $Si_3N_4$ material having grain sizes of 240 nm or less. The densified $Si_3N_4$ material is produced by a sintering process, which includes (i) providing a ceramic powder, (ii) applying heat to the ceramic powder at one or more temperatures in a range of 1600° C. to 1800° C.; and (iii) applying pressure to the ceramic powder at least partially concurrently with applying the heat at an applied load, e.g., in a range of 10 MPa to 50 MPa. The ceramic powder includes a silicon nitride ($Si_3N_4$) powder and at least one impurity constituent intermixed with the $Si_3N_4$ powder, in which the $Si_3N_4$ powder includes $Si_3N_4$ particles having a size within a range of 30 nm to 70 nm and includes beta phase silicon nitride ($\beta$-$Si_3N_4$) in an amount up to about 1% vol. The at least one impurity constituent includes at least one of Si, N, O, C, Mg, and/or Mn and constitutes less than about 0.1% wt to 5% wt of the ceramic powder.

Further embodiments and implementations of the example high temperature resistance and/or high mechanical strength material can include one or more of the following features. For example, the densified $Si_3N_4$ material can have a density in a range of 1.9 g/mL to 3.2 g/mL. For example, the densified $Si_3N_4$ material can have a dielectric constant at room temperature in a range of 3.72 to 7.67, e.g., which can be with a loss tangent of 0.003-0.004. For example, the densified $Si_3N_4$ material can have a dielectric constant at high temperatures at or above 1450° C. in a range of at least 6.15. For example, the densified $Si_3N_4$ material can have a flexural strength in a range of 100 MPa to 1020 MPa. For example, the densified $Si_3N_4$ material can have an elastic modulus of up to 220 GPa. For example, the densified $Si_3N_4$ material can have a room temperature fracture toughness of 3.9 MPa $\sqrt{m}$. For example, the densified $Si_3N_4$ material can have a thermal diffusivity in a range of 0.0799 $cm^2$/s at 200° C. to 0.0253 $cm^2$/s at 1500° C. For example, the densified $Si_3N_4$ material can have a specific heat capacity in a range of 0.97 J/g·K at 200° C. to 1.15 J/g·K at 1000° C. For example, the densified $Si_3N_4$ material can have a thermal conductivity in a range of 20.3 W/m·K at 200° C. to 10.4 W/m·K at 1000° C. For example, the densified $Si_3N_4$ material can be configured such that it includes the $\beta$-$Si_3N_4$ content from 3-100 vol %. For example, the densified $Si_3N_4$ material can have an isothermal processing time of 0 to 30 minutes. For example, the high temperature and/or high mechanical strength material can include a microstructure that has high-purity grain boundaries of alpha phase silicon nitride crystals and/or beta phase silicon nitride crystals. In some examples, the high-purity grain boundaries of the microstructure are without an interphase region; whereas in some example embodiments, the high-purity grain boundaries of the microstructure have an interphase region.

For example, the outcomes of the sintering process on the material's microstructure include (1) sintered $Si_3N_4$ with high-purity grain boundaries, (2) a defined grain boundary area, where an interface between two alpha-phase and/or beta-phase silicon nitride crystals may contain an interphase region or can be produced without an interphase region), and/or (3) a tailored grain boundary area phase.

Figure 2:
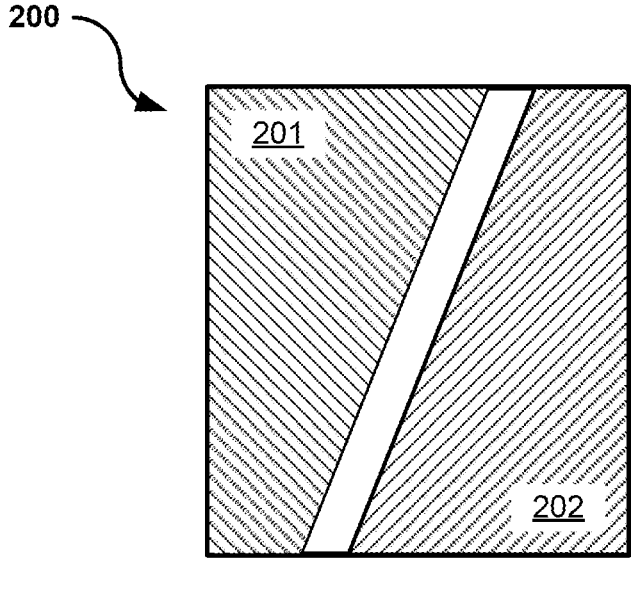
FIG. 2 shows a diagram illustrating an example microstructure of a silicon nitride powder in accordance with some embodiments of the present technology.

FIG. 2 shows a diagram illustrating an example microstructure of a silicon nitride powder in accordance with some embodiments of the present technology. As illustrated in the diagram, a microstructure of an example silicon nitride sintered body 200 includes a first $\beta$-$Si_3N_4$ phase at a grain 201 and a second $\beta$-$Si_3N_4$ phase at a grain 202. It is understood that the diagram of FIG. 2 is for illustrative purposes only, and is not necessarily representative of embodiments of the microstructure in terms of size, shape or distribution of material phases or other materials properties.

Figure 3A:
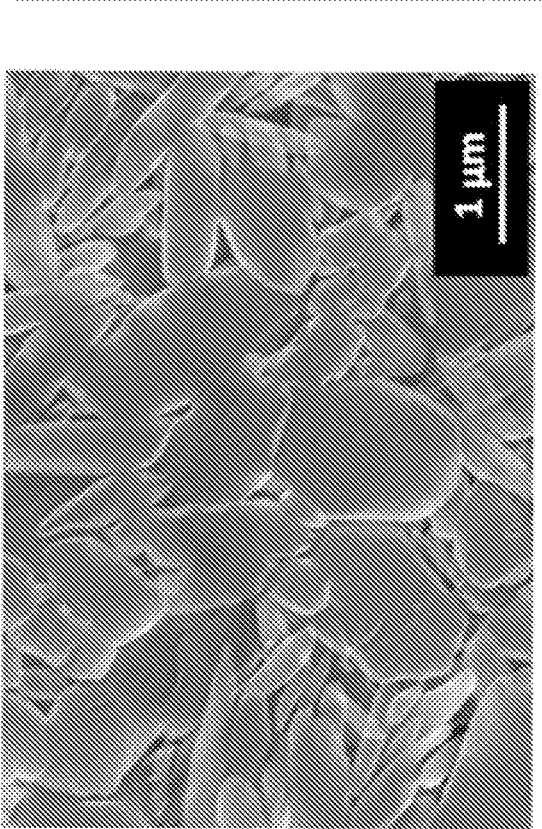
FIGS. 3A and 3B show scanning electron micrograph (SEM) images depicting example sintered bodies produced from example embodiments of the disclosed ceramic powder.
Figure 3B:
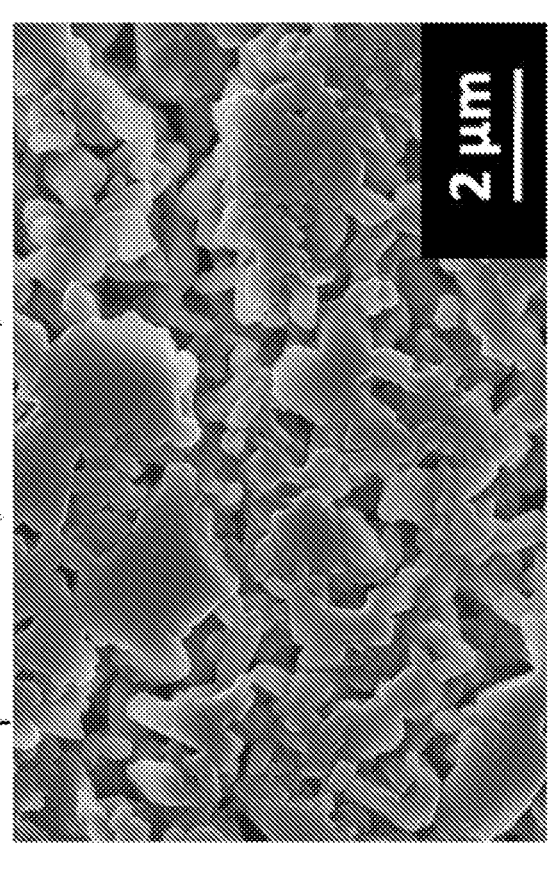

FIGS. 3A and 3B show scanning electron micrograph (SEM) images depicting example sintered bodies produced from example embodiments of the disclosed ceramic powder. The SEM image of FIG. 3A shows example silicon nitride sintered bodies having a microstructure that has high-purity grain boundaries of beta phase silicon nitride crystals with a ~625 nm grain size, such that the silicon nitride material was densified at 99.3% TD. The example silicon nitride sintered bodies of FIG. 3A exhibited material properties including an aspect ratio of 1.75, flexural strength in a range of 100 MPa, and room temperature fracture toughness of 8.1 MPa $\sqrt{m}$ ($\pm$1.2 MPa $\sqrt{m}$). The example silicon nitride sintered bodies were fabricated using an example embodiment of the disclosed ceramic powder configured to have alpha phase silicon nitride in an amount of about 98% vol and beta phase silicon nitride in an amount of about 2% vol.

The SEM image of FIG. 3B shows example silicon nitride sintered bodies having a microstructure that has high-purity grain boundaries of beta phase silicon nitride crystals with a ~400 nm grain size, such that the silicon nitride material was densified at 80.8% TD. The example silicon nitride sintered bodies of FIG. 3B exhibited material properties including an aspect ratio of 1.32, flexural strength in a range of 286 MPa, and room temperature fracture toughness of 4.7 MPa $\sqrt{m}$ ($\pm$0.6 MPa $\sqrt{m}$). The example silicon nitride sintered bodies were fabricated using an example embodiment of the disclosed ceramic powder configured to have alpha phase silicon nitride in an amount of about 60% vol and beta phase silicon nitride in an amount of about 40% vol.

In some embodiments, for example, a ceramic powder for producing high temperature-resistant and/or high mechanical strength materials may consist essentially of a $Si_3N_4$ powder and one or more impurity constituents intermixed with the $Si_3N_4$ powder within the ceramic powder. The ceramic powder comprises $Si_3N_4$ particles having a size within a range of 30 nm to 70 nm, in which the $Si_3N_4$ powder includes beta phase silicon nitride ($\beta$-$Si_3N_4$) in an amount up to about 1% vol. The one or more impurity constituents include Si, N, O, C, Mg, and/or Mn, in which the one or more impurity constituents constitutes less than about 0.1% wt to 5% wt of the ceramic powder.

Further embodiments and implementations of the example ceramic powder can include one or more of the following features. For example, the one or more impurity constituent can include elemental Si, C, Mg or Mn. Also, for example, one or more impurity constituent can include a compound selected from $SiO_2$, SiC, MgO, or MnO. For example, the $Si_3N_4$ powder can include or may consist essentially of alpha phase silicon nitride ($\alpha$-$Si_3N_4$) in an amount up to about 99.99% vol and beta phase silicon nitride ($\beta$-$Si_3N_4$) in an amount up to about 1% vol.

FIG. 4 shows a diagram illustrating an example embodiment of a method for producing a material having high temperature resistance and/or high mechanical strength, such as an example embodiment of the disclosed densified $Si_3N_4$ material in accordance with the present technology. The method 400 includes a process 410 to receive or provide a ceramic powder comprising a $Si_3N_4$ powder and at least one impurity constituent intermixed with the $Si_3N_4$ powder. In some example implementations of the process 410, the $Si_3N_4$ powder includes $Si_3N_4$ particles having a size within a range of 30 nm to 70 nm and includes beta phase silicon nitride ($\beta$-$Si_3N_4$) in an amount up to about 1% vol. In some example implementations of the process 410, the at least one impurity constituent includes at least one of Si, N, O, C, Mg, or Mn and/or constitutes less than about 0.1% wt to 5% wt of the ceramic powder. In some example implementations of the process 410, the $Si_3N_4$ powder can be received or provided in a sintering container. The method 400 includes a process 420 to apply heat to the ceramic powder at one or more temperatures in a range of 1600° C. to 1800° C. The method 400 includes a process 430 to apply pressure to the ceramic powder at least partially concurrently with the application of the heat at an applied load in a range of 10 MPa to 50 MPa. In some implementations, for example, the method 400 is operable to produce a densified $Si_3N_4$ material. In some implementations, for example, the method 400 includes an isothermal processing time of 0 to 30 minutes.

In some implementations of the method 400, for example, the material produced by the method 400 includes a densified $Si_3N_4$ material comprising a microstructure having high-purity grain boundaries of alpha phase silicon nitride crystals and/or beta phase silicon nitride crystals. In some embodiments, for example, the high-purity grain boundaries of the microstructure are without an interphase region, e.g., which are achievable by implementation of the method 400.

In this disclosure, all numerical designations, e.g., pH, temperature, time, concentration, and molecular weight, including ranges, are approximations which are varied (+) or (−) by increments of 1.0 or 0.1, as appropriate, or alternatively by a variation of +/−15%, or alternatively 10%, or alternatively 5%, or alternatively 2%. It is to be understood, although not always explicitly stated, that all numerical designations are preceded by the term "about." It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth. It also is to be understood, although not always explicitly stated, that the reagents described herein are merely exemplary and that equivalents of such are known in the art.

The term "about," as used herein when referring to a measurable value such as an amount or concentration and the like, is meant to encompass variations of 20%, 10%, 5%, 1%, 0.5%, or even 0.1% of the specified amount.

The terms or "acceptable," "effective," or "sufficient" when used to describe the selection of any components, ranges, dose forms, etc. disclosed herein intend that said component, range, dose form, etc. is suitable for the disclosed purpose.

EXAMPLES

In some embodiments in accordance with the present technology (example 1), a ceramic powder for producing high temperature-resistant and/or high mechanical strength materials includes a silicon nitride ($Si_3N_4$) powder, comprising $Si_3N_4$ particles, wherein the $Si_3N_4$ powder includes beta phase silicon nitride ($\beta$-$Si_3N_4$) in an amount up to about 1% vol; and an impurity constituent intermixed with the $Si_3N_4$ powder within the ceramic powder, the impurity constituent comprising at least one of silicon (Si), nitrogen (N), oxygen (O), carbon (C), magnesium (Mg), or manganese (Mn), wherein the impurity constituent constitutes less than about 0.1% wt to 5% wt of the ceramic powder.

Example 2 includes the ceramic powder of any of examples 1-5, wherein the $Si_3N_4$ particles have a size within a range of 30 nm to 70 nm.

Example 3 includes the ceramic powder of any of examples 1-5, wherein the impurity constituent includes elemental Si, C, Mg or Mn.

Example 4 includes the ceramic powder of any of examples 1-5, wherein the impurity constituent includes a compound selected from $SiO_2$, SiC, MgO, or MnO.

Example 5 includes the ceramic powder of any of examples 1-4, wherein the $Si_3N_4$ powder consists essentially of alpha phase silicon nitride ($\alpha$-$Si_3N_4$) in an amount up to about 99.99% vol and the beta phase silicon nitride ($\beta$-$Si_3N_4$) in an amount up to about 1% vol.

In some embodiments in accordance with the present technology (example 6), a material having high temperature resistance and/or high mechanical strength includes a densified silicon nitride ($Si_3N_4$) material, the densified $Si_3N_4$ material having grain sizes of 240 nm or less, wherein the densified $Si_3N_4$ material is produced by a sintering process comprising: providing a ceramic powder comprising a silicon nitride ($Si_3N_4$) powder and at least one impurity constituent intermixed with the $Si_3N_4$ powder, wherein the $Si_3N_4$ powder includes $Si_3N_4$ particles having a size within a range of 30 nm to 70 nm and includes beta phase silicon nitride ($\beta$-$Si_3N_4$) in an amount up to about 1% vol, and wherein the at least one impurity constituent includes at least one of silicon (Si), nitrogen (N), oxygen (O), carbon (C), magnesium (Mg), or manganese (Mn) and constitutes less than about 0.1% wt to 5% wt of the ceramic powder; applying heat to the ceramic powder at one or more temperatures in a range of 1600° C. to 1800° C.; and applying pressure to the ceramic powder at least partially concurrently with applying the heat at an applied load in a range of 10 MPa to 50 MPa.

Example 7 includes the material of any of examples 6-17, wherein the densified $Si_3N_4$ material further has a density in a range of 1.9 g/mL to 3.2 g/mL.

Example 8 includes the material of any of examples 6-17, wherein the densified $Si_3N_4$ material further has a dielectric constant at room temperature in a range of 3.72 to 7.67 and a dielectric constant at high temperatures at or above 1450° C. in a range of at least 6.15.

Example 9 includes the material of any of examples 6-17, wherein the densified $Si_3N_4$ material further has a flexural strength in a range of 100 MPa to 1020 MPa.

Example 10 includes the material of any of examples 6-17, wherein the densified $Si_3N_4$ material further has an elastic modulus of up to 220 GPa.

Example 11 includes the material of any of examples 6-17, wherein the densified $Si_3N_4$ material further has a room temperature fracture toughness of 3.9 MPa $\sqrt{m}$.

Example 12 includes the material of any of examples 6-17, wherein the densified $Si_3N_4$ material further has a thermal diffusivity in a range of 0.0799 $cm^2/s$ at 200° C. to 0.0253 $cm^2/s$ at 1500° C.

Example 13 includes the material of any of examples 6-17, wherein the densified $Si_3N_4$ material further has a specific heat capacity in a range of 0.97 J/g·K at 200° C. to 1.15 J/g·K at 1000° C.

Example 14 includes the material of any of examples 6-17, wherein the densified $Si_3N_4$ material further has a thermal conductivity in a range of 20.3 W/m·K at 200° C. to 10.4 W/m·K at 1000° C.

Example 15 includes the material of any of examples 6-17, wherein the sintering process includes an isothermal processing time of 0 to 30 minutes.

Example 16 includes the material of any of examples 6-17, wherein the high temperature and/or high mechanical strength material includes a microstructure having high-purity grain boundaries of alpha phase silicon nitride crystals and/or beta phase silicon nitride crystals.

Example 17 includes the material of example 16 or any of examples 6-16, wherein the high-purity grain boundaries of the microstructure are without an interphase region.

In some embodiments in accordance with the present technology (example 18), a ceramic powder for producing high temperature-resistant and/or high mechanical strength materials, consisting essentially of a silicon nitride ($Si_3N_4$) powder, comprising $Si_3N_4$ particles having a size within a range of 30 nm to 70 nm, wherein the $Si_3N_4$ powder includes beta phase silicon nitride ($\beta$-$Si_3N_4$) in an amount up to about 1% vol; and one or more impurity constituents intermixed with the $Si_3N_4$ powder within the ceramic powder, the one or more impurity constituents selected from silicon (Si), nitrogen (N), oxygen (O), carbon (C), magnesium (Mg), or manganese (Mn), wherein the one or more impurity constituents constitutes less than about 0.1% wt to 5% wt of the ceramic powder.

Example 19 includes the ceramic powder of any of examples 18-21, wherein the one or more impurity constituent includes elemental Si, C, Mg or Mn.

Example 20 includes the ceramic powder of any of examples 18-21, wherein the one or more impurity constituent includes a compound selected from $SiO_2$, SiC, MgO, or MnO.

Example 21 includes the ceramic powder of any of examples 18-20, wherein the $Si_3N_4$ powder consists essentially of alpha phase silicon nitride ($\alpha$-$Si_3N_4$) in an amount up to about 99.99% vol and the beta phase silicon nitride ($\beta$-$Si_3N_4$) in an amount up to about 1% vol.

In some embodiments in accordance with the present technology (example 22), a method for producing a material having high temperature resistance and/or high mechanical strength includes: providing a ceramic powder comprising a silicon nitride ($Si_3N_4$) powder and at least one impurity constituent intermixed with the $Si_3N_4$ powder, wherein the $Si_3N_4$ powder includes $Si_3N_4$ particles having a size within a range of 30 nm to 70 nm and includes beta phase silicon nitride ($\beta$-$Si_3N_4$) in an amount up to about 1% vol, and wherein the at least one impurity constituent includes at least one of silicon (Si), nitrogen (N), oxygen (O), carbon (C), magnesium (Mg), or manganese (Mn) and constitutes less than about 0.1% wt to 5% wt of the ceramic powder; applying heat to the ceramic powder at one or more temperatures in a range of 1600° C. to 1800° C.; and applying pressure to the ceramic powder at least partially concurrently with applying the heat at an applied load in a range of 10 MPa to 50 MPa, thereby producing a densified $Si_3N_4$ material.

Example 23 includes the method of any of examples 22-34, wherein the produced densified $Si_3N_4$ material includes grain sizes of 240 nm or less.

Example 24 includes the method of any of examples 22-34, wherein the produced densified $Si_3N_4$ material includes a density in a range of 1.9 g/mL to 3.2 g/mL.

Example 25 includes the method of any of examples 22-34, wherein the produced densified $Si_3N_4$ material includes a dielectric constant at room temperature in a range of 3.72 to 7.67 and a dielectric constant at high temperatures at or above 1450° C. in a range of at least 6.15.

Example 26 includes the method of any of examples 22-34, wherein the produced densified $Si_3N_4$ material includes a flexural strength in a range of 100 MP a to 1020 MPa.

Example 27 includes the method of any of examples 22-34, wherein the produced densified $Si_3N_4$ material includes an elastic modulus of up to 220 GPa.

Example 28 includes the method of any of examples 22-34, wherein the produced densified $Si_3N_4$ material includes a room temperature fracture toughness of 3.9 MPa $\sqrt{m}$.

Example 29 includes the method of any of examples 22-34, wherein the produced densified $Si_3N_4$ material includes a thermal diffusivity in a range of 0.0799 $cm^2$/s at 200° C. to 0.0253 $cm^2$/s at 1500° C.

Example 30 includes the method of any of examples 22-34, wherein the produced densified $Si_3N_4$ material includes a specific heat capacity in a range of 0.97 J/g·K at 200° C. to 1.15 J/g·K at 1000° C.

Example 31 includes the method of any of examples 22-34, wherein the produced densified $Si_3N_4$ material includes a thermal conductivity in a range of 20.3 W/m·K at 200° C. to 10.4 W/m·K at 1000° C.

Example 32 includes the method of any of examples 22-34, wherein the method includes an isothermal processing time of 0 to 30 minutes.

Example 33 includes the method of any of examples 22-34, wherein the produced densified $Si_3N_4$ material includes a microstructure having high-purity grain boundaries of alpha phase silicon nitride crystals and/or beta phase silicon nitride crystals.

Example 34 includes the method of example 33 or any of examples 22-33, wherein the high-purity grain boundaries of the microstructure are without an interphase region.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A ceramic powder for producing high temperature-resistant and/or high mechanical strength materials, comprising:

a silicon nitride ($Si_3N_4$) powder, comprising $Si_3N_4$ particles that include alpha phase silicon nitride ($\alpha$-$Si_3N_4$) and beta phase silicon nitride ($\beta$-$Si_3N_4$), wherein the $Si_3N_4$ powder includes the $\beta$-$Si_3N_4$ in an amount up to about 1% vol; and an impurity constituent intermixed with the $Si_3N_4$ powder within the ceramic powder, the impurity constituent comprising manganese oxide (MnO), wherein the impurity constituent constitutes about 0.1% wt to about 5% wt of the ceramic powder, wherein the $Si_3N_4$ particles have a size within a range of 30 nm to 70 nm.

2. The ceramic powder of claim 1, wherein the impurity constituent further includes at least one of elemental Si, C, Mg or Mn.

3. The ceramic powder of claim 1, wherein the impurity constituent includes at least one of $SiO_2$, SiC, or MgO compound.

4. The ceramic powder of claim 1, wherein the $Si_3N_4$ powder consists essentially of alpha phase silicon nitride ($\alpha$-$Si_3N_4$) in an amount up to about 99.99% vol and the beta phase silicon nitride ($\beta$-$Si_3N_4$) in an amount up to about 1% vol.

* * * * *